F. GETTELMAN.
PASTEURIZING.
APPLICATION FILED NOV. 28, 1911.
1,082,743.
Patented Dec. 30, 1913.
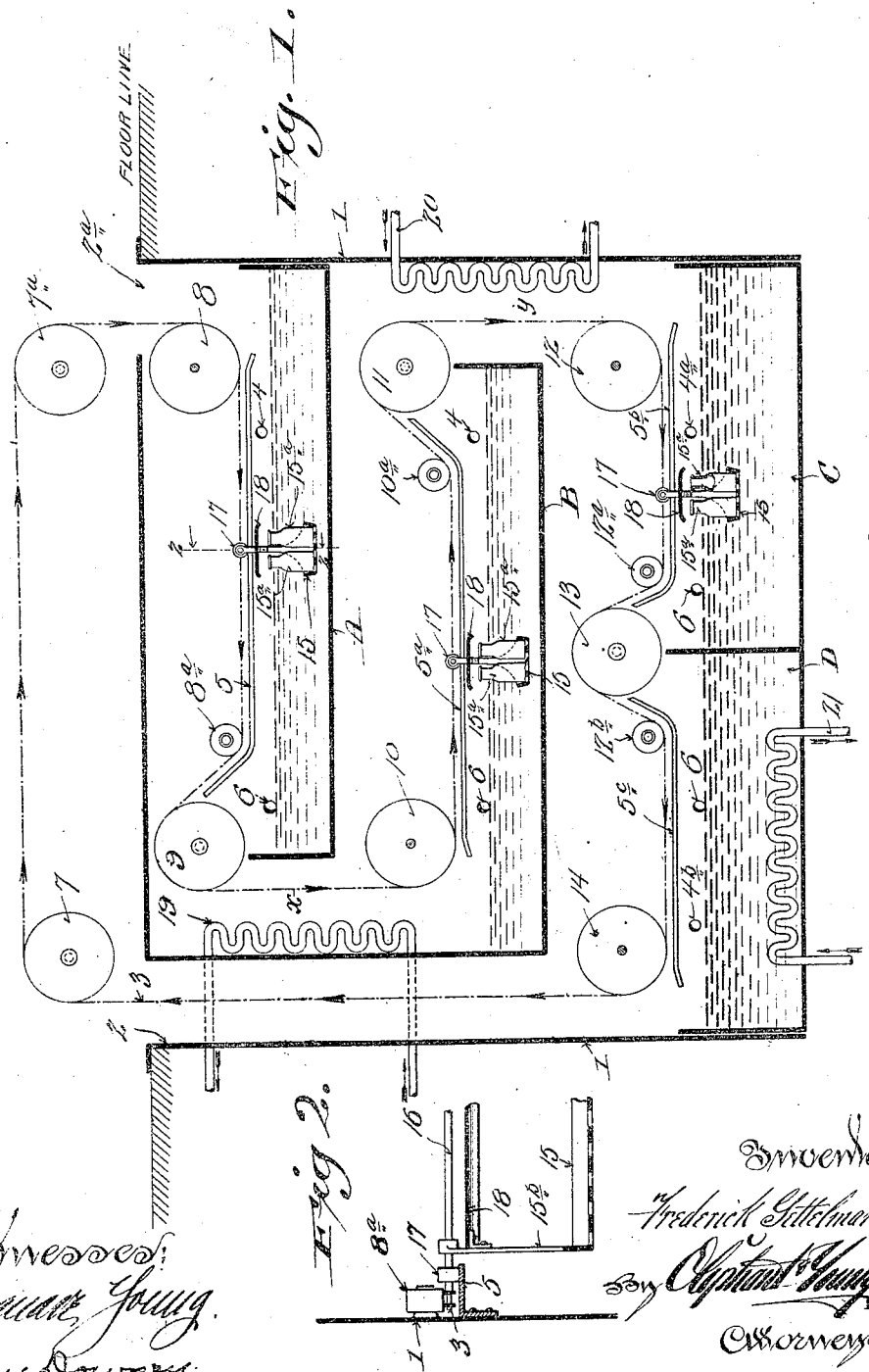

UNITED STATES PATENT OFFICE.

FREDERICK GETTELMAN, OF MILWAUKEE, WISCONSIN.

PASTEURIZING.

1,082,743.  Specification of Letters Patent.  Patented Dec. 30, 1913.

Application filed November 28, 1911. Serial No. 662,871.

*To all whom it may concern:*

Be it known that I, FREDERICK GETTELMAN, a citizen of the United States, and resident of Milwaukee, in the county of Milwaukee and State of Wisconsin, have invented certain new and useful Improvements in Pasteurizing; and I do hereby declare that the following is a full, clear, and exact description thereof.

The primary object of my invention is to increase the efficiency and scope of pasteurizing apparatus in general and particularly apparatus of that character such as described and claimed in a patent issued to me for pasteurizing apparatus dated April 11, 1911, No. 989,141.

In a general way my improved apparatus embodies in its construction and arrangement means for subjecting the bottled product to successive interrupted immersions in water contained in separate vats, the water in each vat being at an initial predetermined temperature whereby said product is gradually brought to the exact pasteurizing temperature desired, at which temperature it is sustained for a period of time and thereafter gradually lowered in temperature preparatory to being removed from the pasteurizing apparatus.

Specific objects of my invention are to provide means whereby open mouthed vessels containing the product to be pasteurized are maintained above the water-line in such position that only the body of the bottles will be submerged as they travel through the water, the product being thus vented during the process of sterilization; to provide protecting shields for the bottles whereby drippings of water or other foreign substance are shed from said open-mouthed bottles; to provide means for controlling the temperature of the product during its travel from one vat to the other, said means including indirect pre-heating and pre-cooling coils, provision being made for placing certain of the coils directly within the vats; to provide an endless conveyer chain having carriers, which chain is supported above the water-line at all times, the carriers being arranged with respect to the water-line in the various vats to submerge the body of the vessels containing the product to be sterilized, and to provide water supply pipes and overflows for the various vats whereby the water-level therein will remain constant.

With the above objects in view the invention consists in what is herein shown and described with reference to the accompanying illustrations and subsequently claimed.

In the drawings Figure 1 represents a diagram view of a pasteurizing apparatus embodying the features of my invention, and Fig. 2, a detail cross-section of a fragment of the conveyer chain and supporting means together with a portion of one of the carriers, the section being indicated by line 2—2 of Fig. 1.

Referring by characters to the drawings 1 indicates a housing forming a chamber having a vertical opening 2 therein that constitutes a well through which the pasteurized product is delivered to operators above the floor-line of the building upon which the housing is supported, the well being disposed at the forward end of the chamber and through which an endless chain conveyer 3 passes. The conveyer chain is driven and supported by a series of pulleys to be hereinafter particularly mentioned mounted within and exteriorly of the chamber.

Suitably supported within the chamber are a series of vats A, B, C, D, the vats being filled to a predetermined height with water from supply-pipes 4, 4, 4ª, 4ᵇ, the height of the water being controlled by overflow pipes 6. Track-rails 5, 5ª, 5ᵇ, and 5ᶜ are disposed above the water-line of the series of vats and serve as longitudinal supporting guides for the chain conveyer. This chain conveyer is arranged to pass over a pulley 7 located above the top-wall of the chamber, the chain being thereafter passed over a pulley 7ª similarly located at the rear end of said chamber. From thence the chain passes down through an opening 2ª at the rear end of the chamber top over a pulley 8 located above the first vat A, from which point it is arranged to travel forwardly and over the guide-rail 5 under a guide-pulley 8ª and from thence said chain is inclined upwardly and is arranged to travel over a pulley 9, being also supported at its inclined section between the pulleys 8ª and 9, by an upwardly inclined section of the guide-rail 5, that parallels the inclined stretch of said chain. The conveyer chain thereafter passes downwardly over a pulley 10 that is disposed above the vat B and from thence it travels parallel to the water-line in said vat and above the same to a guide-pulley 10ª; being upwardly inclined at the rear end of the vat B where it passes over a pulley 11. The conveyer chain is then directed downwardly at the rear end and under another pulley 12 that is disposed over vat C. From this pulley the chain travels forwardly under a guide-pulley 12ᵃ and over a large pulley 13 which is disposed directly above the partition between vats D and C, which vats are in this instance shown arranged upon the same horizontal plane. The conveyer chain after passing over pulley 13 is deflected downwardly by a guide-pulley 12ᵇ, a stretch being then directed parallel with vat D and over the same. The endless conveyer then passes under a pulley 14 from which it travels upwardly through the well 2 to the first pulley 7 whereby the cycle is completed.

From the foregoing it will be seen that the endless chain conveyers thus pass in zig-zag manner back and forth over the series of vats, being alternately dropped and elevated as it enters and leaves each vat in order to immerse the bottled product in the vat water. Each portion of the bottled product is contained in a vessel 15ᵃ, groups of which are assembled in a series of carriers 15 that are pivotally suspended from rods 16, which rods are carried by the chain conveyer, the rods being provided with anti-friction rollers 17 arranged to contact with the guide-rails.

By the above described construction the several stretches of the aforesaid chain conveyer are relieved of sagging strain to which they would otherwise be subjected and thus friction being reduced to a minimum a proportionately less amount of power is required to operate the apparatus. Furthermore it is apparent that owing to the arrangement of guide-rails which support the carriers 15 that the latter are always held in a position whereby they are submerged at a predetermined depth. By this arrangement the vessels or bottles 15ᵃ containing the product can be submerged to the proper depth so that their necks are above the water-line and can thus be open to the atmosphere without danger of injury to the contents thereof incidental to travel through the sterilizing liquid.

Each bottle-carrier 15 has secured thereto a shield 18 that is connected to the supporting bails 15ᵇ of the carrier and is disposed just above the open mouths of the vessels whereby they are protected and any water drippings or foreign matter that may drop upon the tray incidental to its travel is deflected from the vented vessels whereby their contents will not be polluted.

As clearly shown in the diagram a heat regulator in the form of a coiled pipe 19 is arranged in juxtaposition to the forward end of the first vat A, which coiled pipe parallels the vertical stretch *x* of the conveyer chain between said vat and the second vat B. A similar coil 20, which, in this instance, is adapted to receive a cooling medium, is mounted within the chamber in juxtaposition to the vertical stretch *y* of the conveyer chain that passes from the second vat B to the third vat C, the latter vat being provided with water which is designed as a cooling medium, being of slightly lower temperature than the water contained in vat B, which vat may be termed the sterilizing vat and, for example, contains water at a temperature of approximately 149°. The last vat D of the series may be termed a cooling vat and contains water which may, as shown, be held at a predetermined low temperature by a cooling medium that is introduced indirectly thereto through a coiled pipe 21.

From the foregoing it will be apparent that in carrying out my improved method of pasteurizing that the product on entering the chamber is approximately at atmospheric temperature and the vessels containing the product being open to atmosphere as previously mentioned, said vessels are first submerged in vat A, which contains water at a desired intermediate temperature whereby the product is raised in temperature gradually preparatory to being submerged in the pasteurizing vat B. Before entering said vat the product is pre-heated in its travel downwardly by indirect radiation from the heating coil 19 and thus in its travel from the first vat to the pasteurizing vat the temperature of the product is held constant or slightly pre-heated. Hence there is no sudden rise in the temperature of the product as it is submerged into the liquid containing vat B. Pasteurizing is effected as the carrier containing the product passes from the forward end to the rear end of vat B, and thereafter it is desirable to gradually cool the pasteurized product. The initial pre-cooling is effected by indirect contact with the cooling medium introduced through coil 20. A further cooling of the product is effected as it travels through vat C, the final cooling being accomplished incidental to the travel of the carrier through vat D, the liquid in which, as shown, is maintained at a predetermined temperature by the cooling medium 21. The pasteurizing is now completed and the endless carrier raises the product up through the well 2 to the floor-line of the building where said product is unloaded in any desired manner.

While I have shown and described the chamber as being provided with four vats it is apparent that this number may be diminished or increased in accordance with the conditions required with reference to the product to be sterilized, particular attention being called to the fact that the product is pre-heated or pre-cooled by artificial means incidental to its travel from one vat to the other, whereby sudden variations in temperature are avoided in the interrupted steps of bringing the product to a pasteurizing temperature and thereafter gradually cooling the same, the said temperature regulating means being introduced in any desired form in the relative positions described and illustrated.

It will also be observed that, as previously stated, the bottles or vessels containing the product are at no time totally submerged but are held in such a position relative to the water-line in the vats that the sterilized product is exposed to atmosphere.

I claim:

1. In a pasteurizing apparatus having a series of vats arranged one above the other adapted to contain water at progressively higher temperatures to an intermediate vat and progressively lower temperatures from said intermediate vat, an endless conveyer arranged to travel parallel with the water-line of the first vat and having a vertical stretch intermediate of the first and second vats, the conveyer being provided with a second stretch adapted to travel parallel with said second vat and provided with a second vertical stretch between said second and third vats, and vessel carriers in pivotal union with the conveyer; the combination of a heating coil arranged parallel with the first mentioned vertical belt stretch, and a cooling coil arranged parallel with the second vertical stretch of said belt.

2. In a pasteurizing apparatus having a series of vats arranged one above the other adapted to contain water at progressively higher temperatures to an intermediate vat and progressively lower temperatures from said intermediate vat, an endless conveyer arranged to travel parallel with the water-line of the first vat and having a vertical stretch intermediate of the first and second vats, the conveyer being provided with a second stretch adapted to travel parallel with said second vat and provided with a second vertical stretch between said second and third vats, and vessel carriers in pivotal union with the conveyer; the combination of an indirect heating means arranged parallel with the first mentioned vertical belt stretch, and an indirect cooling means arranged parallel with the second vertical stretch of said belt.

In testimony that I claim the foregoing I have hereunto set my hand at Milwaukee in the county of Milwaukee and State of Wisconsin in the presence of two witnesses.

FREDERICK GETTELMAN.

Witnesses:
  Geo. W. Young,
  May Downey.